US007490116B2

(12) United States Patent
Carson et al.

(10) Patent No.: US 7,490,116 B2
(45) Date of Patent: Feb. 10, 2009

(54) IDENTIFYING HISTORY OF MODIFICATION WITHIN LARGE COLLECTIONS OF UNSTRUCTURED DATA

(75) Inventors: Dwayne A. Carson, Mendon, MA (US); Donato Buccella, Watertown, MA (US); Michael Smolsky, Brookline, MA (US)

(73) Assignee: Verdasys, Inc., Waltham, MA (US)

( * ) Notice: Subject to any disclaimer, the term of this patent is extended or adjusted under 35 U.S.C. 154(b) by 0 days.

(21) Appl. No.: 10/738,924

(22) Filed: Dec. 17, 2003

(65) Prior Publication Data

US 2004/0167921 A1    Aug. 26, 2004

Related U.S. Application Data

(60) Provisional application No. 60/442,464, filed on Jan. 23, 2003.

(51) Int. Cl.
*G06F 17/30* (2006.01)
(52) U.S. Cl. .......................................... 707/205; 707/6
(58) Field of Classification Search ................. 707/1–3, 707/10, 200, 202, 203, 204, 6, 205, 100; 713/164–167; 515/200
See application file for complete search history.

(56) References Cited

U.S. PATENT DOCUMENTS 5,926,812 A    7/1999    Hilsenrath et al.
5,940,830 A *  8/1999    Ochitani ...................... 707/10
6,311,176 B1 * 10/2001   Steiner ......................... 706/45
6,633,882 B1   10/2003   Fayyad et al.
6,675,159 B1 *  1/2004   Lin et al. ....................... 707/3
6,947,933 B2 *  9/2005   Smolsky ........................ 707/6
7,047,236 B2 *  5/2006   Conroy et al. .................. 707/3

OTHER PUBLICATIONS

Brin, S., et al.: "Copy Detection Mechanisms for Digital Documents," *SIGMOD Record*, ACM, New York, NY, vol. 24, No. 2, pp. 398-409 (Jun. 1, 1995).

* cited by examiner

*Primary Examiner*—Mohammad Ali
*Assistant Examiner*—Marc R Filipczyk
(74) *Attorney, Agent, or Firm*—Hamilton, Brook, Smith & Reynolds, P.C.

(57) ABSTRACT

A technique for efficient representation of dependencies between electronically-stored documents, such as in an enterprise data processing system. A document distribution path is developed as a directional graph that is a representation of the historic dependencies between documents, which is constructed in real time as documents are created. The system preferably maintains a lossy hierarchical representation of the documents indexed in such a way that allows for fast queries for similar but not necessarily equivalent documents. A distribution path, coupled with a document similarity service, can be used to provide a number of applications, such as a security solution that is capable of finding and restricting access to documents that contain information that is similar to other existing files that are known to contain sensitive information.

18 Claims, 7 Drawing Sheets

DDP 150

| FILED ID FROM | FILE ID TO | OPERATION |
|---|---|---|
| A' | C' | INITIALLY SIMILAR | 301
| A | A' | COPY | 302
| A | A" | RENAME | 304
| ⋮ | ⋮ | ⋮ |
| A" | E | EDIT | 306
| D | E | EDIT | 307
| E | φ | EMAIL | 308
| ⋮ | ⋮ | ⋮ |

IDENTIFYING HISTORY OF MODIFICATION WITHIN LARGE COLLECTIONS OF UNSTRUCTURED DATA

RELATED APPLICATION

This application claims the benefit of U.S. Provisional Application No. 60/442,464 entitled "Method and System for Adaptive Identification and Protection of Proprietary Electronic Information," filed on Jan. 23, 2003. The entire teachings of the above-referenced application are hereby incorporated by reference.

BACKGROUND OF THE INVENTION

Almost all organizations now store a substantial amount of their information, including sensitive information that may contain intellectual property, as electronic files in a variety of formats. There are many reasons for this trend, including the low cost and widespread availability of computers, the ever decreasing cost for electronic and magnetic storage media itself, access control, and the relative ease with which archival backups of information may be maintained.

One strong motivation for electronically storing data is the ease with which one can then efficiently query large quantities of files for specific information. Several algorithmic approaches have been proposed to address this problem. One widely known technique is limited to textual content and is most commonly used in Web-based search engines. In this approach, a user types a word or a set of words into a search engine and the search engine then processes a pre-indexed image of a huge data collection to fetch documents that contain the word and/or words specified in the search criteria.

A refinement of this approach enables the user to input the information in a more user-friendly, human language form (as opposed to a set of words or word combinations linked with Boolean-logic like operators, e.g. "dealer AND truck AND Boston AND sale"). These so-called "natural language" interfaces permit a user to input a query such as "Which truck dealer in Boston area is currently advertising a sale?". Other techniques such as image pattern recognition and mathematical correlation can be used for finding information in non-textual data collections, such as in pictures (e.g. to find if a person whose face is captured by a security camera is located in a database of known criminals).

As technology has evolved, and as hardware has become more available and affordable, computer users gained the ability (and actually prefer) to keep multiple copies of the same document. Such copies often differ only by a small amount of edits: text appended, removed or rearranged; images cropped; one document split into two, or a few documents merged. A document might be also converted to a different format, e.g. a text file with typesetting instructions can be converted into a print-ready form. These multiple copies of the same or a very similar document might be kept on the same computer. However, they may also be distributed among many computers connected to a local area network or wide area network, thus residing in different departments, or may even be in multiple locations that are physically many thousands of miles apart.

The ease with which multiple copies of the same document may be created, however, causes certain problems. Among these concerns are data security—the more copies of a document there are, the harder it is to control access to its content.

document classification—copies of similar documents may need to be processed in the same way, without user intervention, and it is desirable to be able to do this automatically.

genealogy—identifying the history of how a particular document evolved forensics—identifying who may have tampered with a document regulatory compliance—certain laws and rules in the health and financial industry now require that documents be access controlled and/or automatically destroyed after certain time periods.

Existing data mining algorithms are not efficient, accurate or scalable enough to calculate similarity between documents and reconstruct document distribution paths.

SUMMARY OF THE INVENTION

In accordance with one aspect of the present invention, a method and system for efficient discovery of the similarity between data from a large document collection and a given piece of data (which may be new or which may belong to that collection) is provided.

More specifically, the system can be implemented as a software program that is distributed across the computers in an organization. A client-side monitor process reports digital asset related activities of computer users (e.g., sensitive user documents being copied, modified, removed or transmitted). Using these activity reports a data security application can maintain a Document Distribution Path (DDP) as a directional graph that is a representation of the historic dependencies between the documents. The DDP is constructed on the basis of the system observing the history of user activity.

The system also preferably maintains a very much reduced ("lossy") hierarchical representation of the user data files, indexed in a way that allows for fast queries for similar (but not necessarily equivalent) information. The system can thus respond to queries such as "find documents similar to a given document". This information is then used in further completing the DDP graph in instances when certain operations are not visible to the client monitor process.

Document similarity queries can originate from users, manually, or can be applied and/or be implemented as part of a distributed data processing system service. A document similarity service, called the Similarity Detection Engine (SDE) can be used to provide an organization-wide security solution that is capable of finding existing files "which contain data similar to a new file", and applying the appropriate controls to new files automatically. In a preferred embodiment, the SDE uses sparse representations of documents to speed up the similarity determination. The sparse representation preferably consists of a hierarchy of solicited Fourier coefficients determined from selected portions or "chunks" of the file. Algorithms are used to selectively choose Fourier coefficient components that are a best representation of the document.

The system is transparent to an end user and exploits only a small fraction of available resources of a modem computer workstation. The system may require a dedicated server or a server cluster to support a large number of client workstations.

The system can thus be used to provide a data management application that has the ability to automatically maintain and/or reconstruct a document distribution path. This path identifies: 1) the origin of a document, 2) its distribution path from its point of origin, and 3) the name of the user who altered the document and the time the alterations occurred.

An organization can apply this ability of the present invention to a number of end uses. For example, the invention can be used to monitor document flow and streamline corporate practices by identifying and resolving critical information exchange bottlenecks that impact work flow.

This feature can also be implemented in information security applications by enabling automatic identification of similar documents in real time, even across large collections of documents in an enterprise. Document similarity analysis can be utilized to determine document sensitivity, which is a necessary data security function, to prevent improper access or the distribution of sensitive data without interfering with the exchange of non-sensitive documents.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 illustrates the components of a Similarity Discovery System, according to the present invention. On the client side, a Similarity Detection Engine (SDE) supports document chunk similarity queries from an SDE-dependent application. For this purpose, the SDE monitors system events related to document management and maintains a hierarchical structure representative of document files. The elements of the hierarchical structure of a given file are referenced as Fourier components of data "chunks", whose identifiers (IDs) as well as locations within the original source file are stored in a built-in Document Chunk Database. The client-side database also stores a Document Distribution Path (DDP). An optional enterprise-wide server can be used to collect the data from client-based SDEs and services queries which can not be serviced by the local SDE.

FIG. 6 illustrates the architecture of a hierarchical structure used by the SDE to represent a data file. The structure represents the space of vectors of Fourier coefficients of data stored in chunks of documents. Each higher-level cluster holds a reference to a collection of lower-level clusters. The bottom level clusters host the elements of the above-mentioned Fourier coefficient space.

DETAILED DESCRIPTION OF A PREFERRED EMBODIMENT

Introduction to the System Environment

Figure 1:
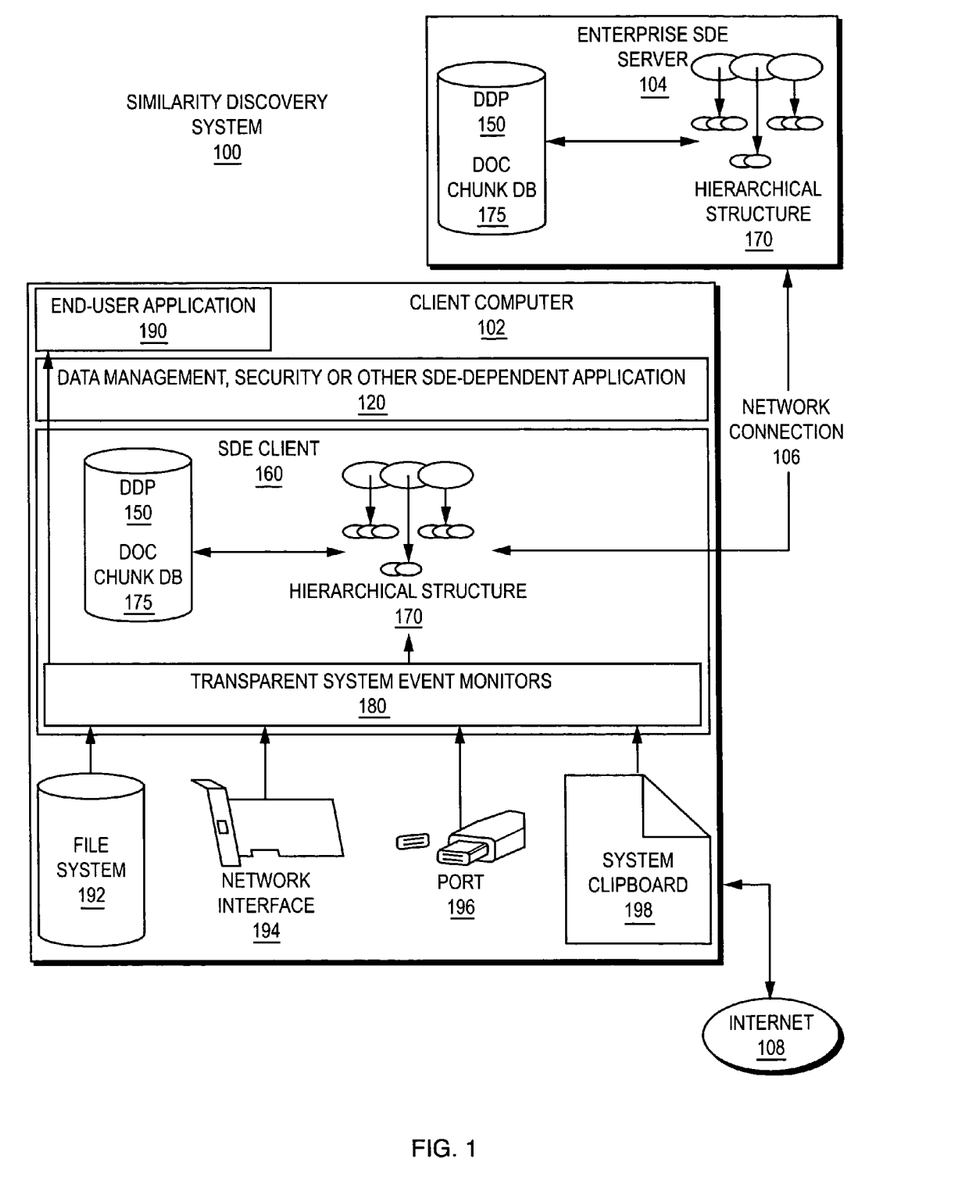

A high level conceptual representation of a data Similarity Discovery System 100 is presented in FIG. 1. Client 102 and server 104 (if utilized) computers constantly monitor user activity and collect information on data files or other "digital assets" such as document files that contain valuable information. The monitored events only include detecting and recording information about documents being modified (created, copied, moved, deleted, edited, or merged) by the computer operating system (OS) as well as its users. This information is represented as a data structure referred to as the Document Distribution Path (DDP) 150, which is typically implemented as a directed graph where the vertices represent documents and edges describe historic relationships between the documents. The DDP 150 is stored in the database, together with other information on files and their chunks.

In many cases, OS and networking protocol architecture prevents a system 100 from reconstructing historic relationships between all documents. In particular, if a user receives a document as an email attachment and saves it to disk, existing email protocols do not support applications that track the file back to its origin on another workstation on the organizational network (document origin). In such cases, the system 100 can use a Similarity Detection Engine (SDE) 160 (to be described later in detail) to query the received document against the database of existing documents. The system will then use the query results to initially construct the DDP 150.

The SDE 160 maintains a database of "chunks" of documents available on the system. It converts data in these chunks into a highly-compressed hierarchical structure representation 170, which is an optimal form to use to approximately measure similarity between chunks. It also maintains chunk source information within Document Chunk Database 175.

The system may be configured to run on a single standalone local machine 102 in which case the DDP 150, SDE 160, and hierarchical structure 170 all reside therein. However, it should be understood that the system can also be implemented as an enterprise-wide data management or security solution. In that case, client devices 102 and servers 104 are connected via local area network and/or inter-network connections 106. Connections to an outside network, such as the Internet 108, can also be made in such systems, so that files may originate and/or be distributed outside the enterprise.

In the networked environment, the DDP 150, SDE 160, and hierarchical structure 170 components will typically be distributed among multiple clients 102 and servers 104 and/or server clusters. The SDE 160 can thus maintain the hierarchical database 170 representation of documents on a local machine 102, on a server 104, in a distributed fashion, and/or a cluster of servers 104 in the same compressed representation. In the cluster and/or distributed implementation, a local SDE 160 queries a server SDE 104 when it cannot respond to a query against a newly received document. The local SDE 160 then updates the server SDE 104 when a user creates a new document or modifies an existing document. Once the update reaches the server SDE 104, it is immediately available for the queries by other local SDEs 160 running on other client workstations. In a situation where the client 102 is disconnected from the network 106 (e.g. a laptop user is out of the office on a trip), communication requests are postponed and queued till the time when the network connection is restored.

The DDP 150 and SDE 160 can be used in a number of different applications 120. In one such application, a data security application can be used to establish a perimeter of accountability for document usage at the point of use. The accountability model can not only track authorized users access to documents but more importantly, can monitor attempts to access or move copies of sensitive documents to peripherals or over network connections. Thus, the SDE-dependent security application 120 can be used to control or thwart attempts to distribute or record sensitive intellectual property or other information, or other possible abuse of authority events.

A system component called the transparent system event monitor 180 acts as an agent of the application 120. The monitor 180 is interposed between an Operating System (OS) running on the client 102 and end user applications 190. The monitor process 180 has sensors or shims to detect read or write operations to file system 192, network interfaces 194, ports 196, and/or system clipboard 198. The sensors in the monitor process 180 may be used to detect possible abuse events that may occur whenever a user accesses devices which are not visible to or controllable by a local file server. These events may include writing documents to uncontrolled media such as Compact Disk-Read Write (CD-RW) drives, Personal Digital Assistants (PDA), Universal Serial Bus (USB) storage devices, wireless devices, digital video recorders, or printing them. Other suspect events can be detected by the network sensors 194 to detect events such as external Peer-to-Peer (P2P) applications, sending documents via external e-mail applications, running Instant Messaging (IM) applications, uploading documents to web sites via the Internet 108, and the like.

Data typically collected with an event depends on the event type and the type of information which is desired to be maintained in the DDP 150. Such information can include:

For file operations, source/destination file name, operation type (open, write, delete, rename, move to recycle bin), device type, first and last access time For invoked applications, the identity of the invoking process, executable name, start time, end time, and process owner For user operations, such as log on or log off, the time and user identification (ID)

For network operations, source/destination address, port and host names, start/end time stamp, bytes sent and received, inbound and outbound data transmission times For clipboard operations, destination process ID, event start time, full path of filename involved For other high level operations, such as access to removable storage media, file name, device ID, time of day, bytes transferred, and the like.

In case, when the Similarity Discovery System is a part of a security system, the monitor process 180 may also be used to receive and enforce access policies as defined by the security application 120, such as by restricting access to local documents, forbidding writes to removable media, or limiting network traffic.

The event monitor 180 process may include heuristics to limit processing by the application 120, DDP 150 and/or SDE 160. A typical heuristic may include an approved file filter to automatically filter the dozens of inconsequential events generated by standard calls to system files. For example, it is quite common for many different executable and dynamic library operating system files, font files, etc. to be opened and accessed repeatedly from the same application.

More details of the event monitor 180 and its interaction with a security application 120 are contained in a co-pending related U.S. patent application Ser. No. 10/706,871 by Verdasys, Inc, entitled "Managed Distribution of Digital Assets" filed Nov. 12, 2003, which is hereby incorporated by reference in its entirety. It should be understood, however, that other types of SDE-dependent applications 120 can make use of the present invention.

Creating a Document Distribution Path (DDP) 150 Representing Document Genealogy As part of the data security application 120 mentioned above, the system typically creates a Document Distribution Path (DDP) 150 representation of the historical events concerning document flow within a system. The DDP may typically be a directed graph where the nodes or vertices are document identifiers and edges describe historic relationships between the documents. By maintaining such a graph, security policies can be applied to documents, in real time, as they are created, modified, and/or accessed.

The similarity of new versions of documents with the sources of their origin can also sometimes be uncovered by monitoring the activity of the computer system (e.g. whenever a document is renamed or copied or merged). In other cases (e.g. when a document is received from a network 108) this similarity can only be revealed by determining whether a document is similar to an existing document in the database. That is another example of a situation where the SDE 160 becomes an important part of the security application 120.

Figure 2:
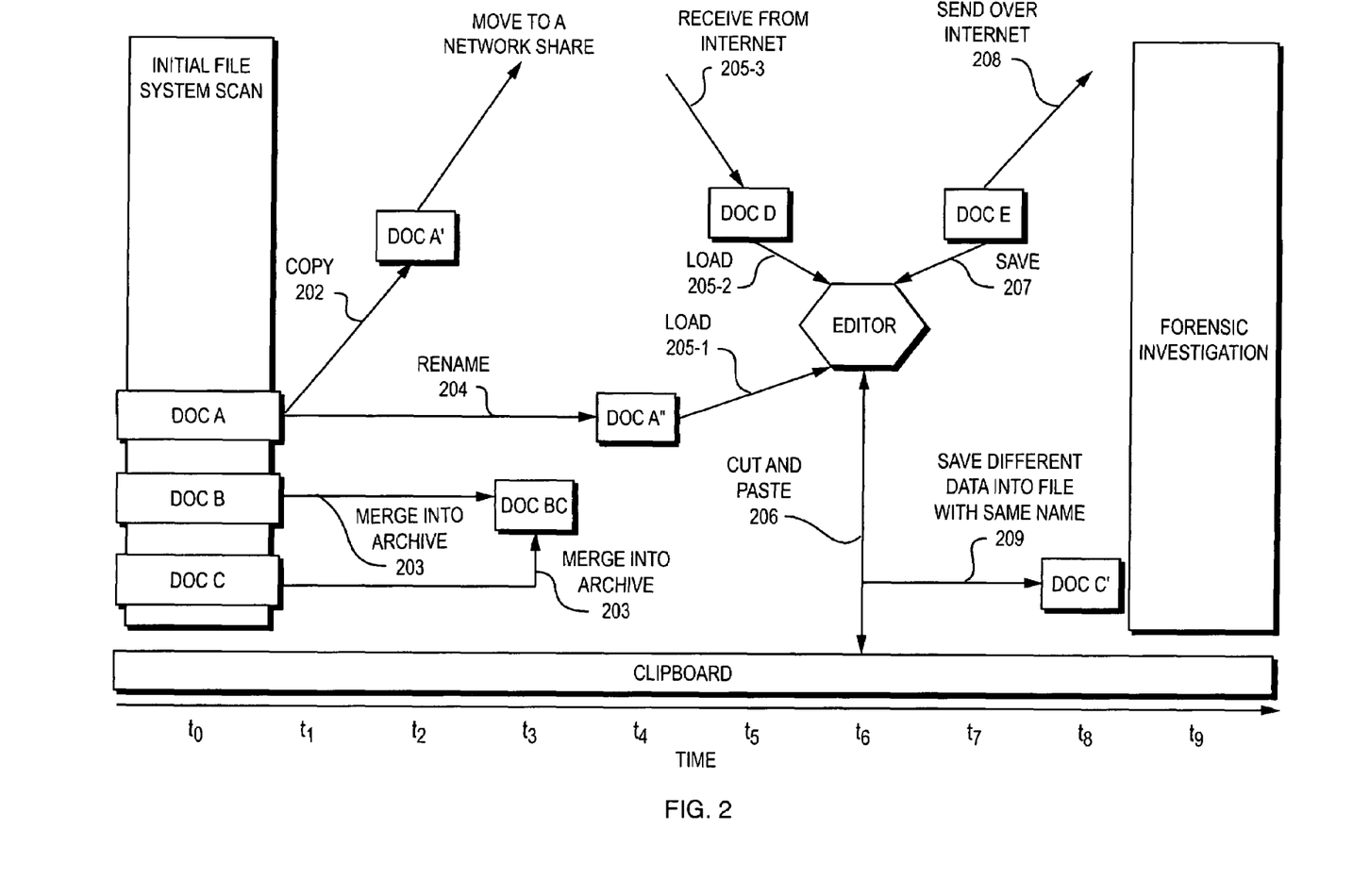
FIG. 2 illustrates one example scenario of the paths of document flow within a computer system. The SDE has no information on the origin of the documents at time $t_0$ and scans the file system in order to generate the built-in hierarchical structure, as well as the Document Distribution Path (DDP). The similarity of new versions of documents with the sources of their origin can sometimes be uncovered by monitoring the activity of the computer system (e.g. when a document is renamed or copied or merged). In other cases (e.g. when a document is received from a network) this similarity can best be revealed by querying the SDE.
Figure 3:
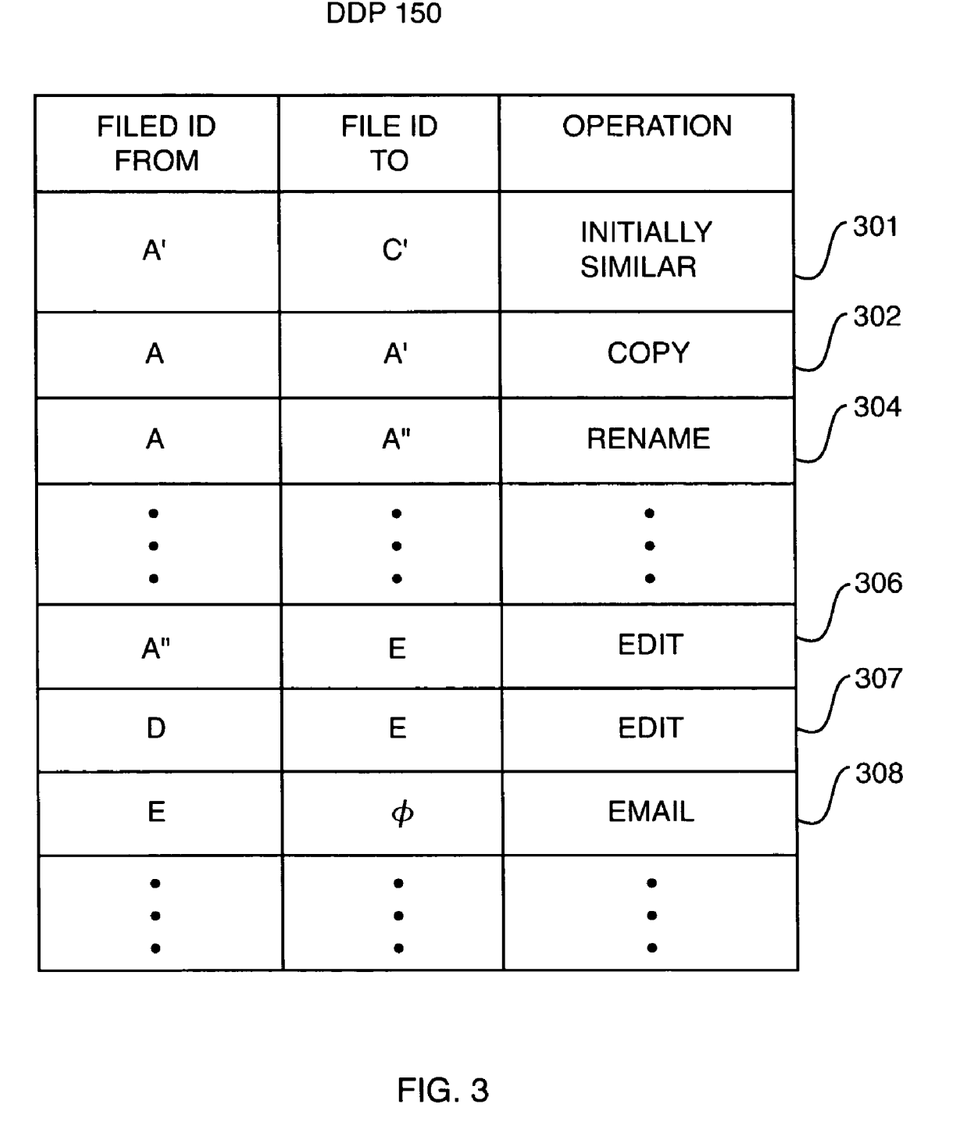
FIG. 3 is an example of entries in a relational database of representation of the Document Distribution Path (DDP), which records the relationships between documents and how they were created.

FIG. 2 illustrates one example scenario of the paths of document flow within a computer system, and how the representative DDP150 might be constructed. At an initial time, $t_0$, the system has no information on the origin of three documents (labeled "Doc" A, B, and C in FIG. 2) in the database. The security application can however use the SDE 160 to run a comparison of Documents A, B, and C, and to establish an initial conclusion that Documents A and C are similar. This result is then stored as an entry 301 in a set of relational data entries in the DDP 150, as shown in FIG. 3.

In addition, if Document A has been marked with a high security setting, but Document C has hereto for not be identified as such, since the SDE 160 determined the documents to be similar, the security application 120 will now apply the same security settings to Document C. Thus, a general algorithm which can be applied by the security application, 120 when confronted with a new document, is to use the SDE 160 to search for similar documents. If a similar document is found, then the same security setting can be assumed for the new document.

At time $t_2$, a copy event 202 is detected by the event monitor 180 (FIG. 1), reporting that Document A has been copied and stored as Document A'. This is recorded in the DDP 150 as another entry 302 (see FIG. 3). Since this was a simple copy operation, the similarity of the documents is assumed, and the SDE 160 does not need to be used to complete the relation between the two documents.

Time $t_3$ sees a file merge event 203, where Document B and Document C have been merged in to a new Document BC. Since Document C has carried a high security label, one result might be that such a label is then applied automatically to the merged document BC.

At $t_4$, the event monitor 180 reports a rename 204 of Document A to Document A". This event is stored in the DDP 150 as entry 304 (see FIG. 3).

Next, at $t_5$, two events occur that are an example of a situation where the forensics would be difficult to decipher without having both the event monitor 180 and the rest of SDE 160. Event 205-1 reports that the sensitive Document A has been loaded into an editing program (such as Microsoft Word). Event 205-3 reports that Document D has been received from the Internet and also opened in the editor. The SDE 160 however does not presently know the origin of Document D (in fact, in this example, the user is working on Document D as a personal birthday party invitation, and to make a correct decision, the system should not classify it as a sensitive document). Time $t_6$ sees a cut and paste operation event 206 with the clipboard. However, a challenge is presented by the fact that the cut and paste operations of Microsoft Word are "out of scope" of the security application 120, and therefore it is hard to trace the document genealogy by simply tracking filenames and save operations. Thus, the scope of the detected operation is not known to security application 120.

At $t_7$, the event monitor sees a save operation to Document E, and at time $t_8$, the event monitor 180 reports event 208: Document E is sent over the Internet. Has the user stored and sent information from a sensitive Document A" as Document E, compromising security? Or has she just created a birthday invitation Document E from Document D?

Here, the results of the SDE 160, requesting a comparison of Document A" to E and Document D to E can greatly improve the accuracy of the security classifications. If Document E is reported back as being very similar to D, then this is a low security event, no breach has occurred and the Internet transfer operation can be permitted to continue (and/or not reported). However, if Document E is similar to Document A", then a possible violation has occurred, and the security application can take appropriate steps, as stipulated by the enterprise security policy. It is generally not satisfactory to misclassify low-risk event as a high-risk event, since that error leads to many false alerts, which significantly raise the cost of operating the security system.

Appropriate entries 306, 307, and 308 (see FIG. 3) recording these events will be entered into the DDP 150, recording the history of where the new Documents D and E originated from, and the fact that Document E was shipped out.

At time $t_8$ a save event 209 is detected from some application, with different data being saved to a new file having same name as an old file, Document C'. Again, the SDE 160 engine can be used to classify Document C' by comparing its contents against the database, rather than simply assuming that files with the same filename should be assigned the same security classification.

At time $t_9$ a Forensic Investigation was required because the security department of the company received a report of a leak of proprietary information. Such an investigation can be substantially simplified and made more accurate if DDP 150 information is available to the investigators. Therefore, even if the system is not configured to block distribution of sensitive information outside the enterprise, the forthcoming investigation may detect such leaks and take legal measures against violators, once appropriate logging and reporting are provided.

The SDE 160 can also report a degree of similarity (a real number) as a result of a comparison of two files. That number can then be used and/or carried into the DDP. So, for example, if the SDE 160 reports that a new Document E is 60% similar to Document A" and 32% similar to Document D, this information can also be important in reconstructing forensics of how documents were created.

The document-to-document degree of similarity is preferably calculated on the basis of a number of similar "chunks" in two documents, relatively to overall number of chunks in the documents. (A detailed discussion of one such algorithm is contained below.) Formulae common to probability theory might be used as an estimate, when one of the files is unavailable, and similarity to it should be calculated on the basis of known similarities to other files: e.g. if the similarity of an unavailable Document A to B is known to be $S_{AB}$, and similarity of Document B to C is known to be $S_{BC}$, then similarity between A and C can be estimated as $S_{AC} \approx 1-(1-S_{AB})(1-S_{BC})$. This formula might be made substantially more accurate, if the number of such files, similarity to which of an unavailable file A and queried file C is known is large.

Compressed Internal Representation of Data Used by the SDE 160

We now turn to a description of how the SDE 160 determines if two documents are similar. A practical implementation of the SDE 160 must meet several requirements. Typically, even rather dissimilar information should be considered as similar for the purposes outlined above (e.g. a heavily modified document should be considered similar to its origin). Since the amount of information a typical user now handles can be very large, and the amount of data transferred between systems can often occur at a huge rate, the SDE 160 must be very computationally effective and accurate. The amount of memory and disk space needed for the SDE 160 must necessarily be very limited in order to fulfill the requirement of transparency for the end user.

One general observation in implementing an efficient SDE 160 is that two chunks of the same size taken from two binary data-streams are usually considered to be similar if there exists a long sequence of bytes in one of them which closely (not necessarily exactly) matches one from the other. Mathematically, a quantity that measures such a similarity could be the "covariance" between the chunks (pairs of bytes taken from each chunk are considered to be two-dimensional datapoints for the purpose of calculating the covariance). In the implementation for the SDE 160 described here, a desirable chunk size is an adjustable parameter with a typical value of one (1) KiloByte (KBt). This number is a parameter of the system and can be made larger or smaller, depending on the desired speed versus accuracy tradeoffs of the SDE 160, amount of information it has to hold, typical size of a document, etc.

A typical operational scenario involves a stream of data thus contains more than one chunk, and, separately, a (possibly large) set of chunks that this data stream must be matched against. The goal is to find out whether a chunk similar to one from the stream is present in the data set. Classical algorithms, such as "substring search" or "number of edits" are not practical because they query every chunk of the stream, starting from every character position, against the dataset of chunks. If classical algorithms are improved to query only non-intersecting chunks from the given stream, they will very rarely find a pair of similar chunks, because when they break the data stream, they cannot properly guess the positional shift or "phase" of the break.

In a preferred embodiment, the SDE 160 instead matches the absolute values of the Fourier coefficients of chunks, and even detects the similarity between chunks that are phase-shifted with respect to one another by a substantial amount. Using the hierarchical chunk representation, to be described below, the SDE 160 only needs about 10% of the whole set of Fourier coefficients to identify a correct match, and can maintain them in low accuracy form (byte, or even half-byte per each).

Therefore, the compressed internal representation of data, which can be effectively used for data comparison purposes, is a subset of absolute values of Fourier coefficients of short chunks of the data, kept in low accuracy form.

Clustering and Indexing Algorithm

Fourier transform-based chunk comparison is thus the core strategy of the SDE 160 (see FIG. 1). Existing source document files (e.g., Documents A, A', A", B, C, etc. described above) are thus broken into small chunks (of about 1 KBt each), and some of their Fourier coefficients are kept in a chunk database 175. When the SDE 160 receives a new data stream, it breaks it down into a set of chunks, which are matched against the database 175. The SDE 160 returns the result of the match in terms of the similarity between new data stream and existing documents, which host the chunks on the database.

Figure 4:
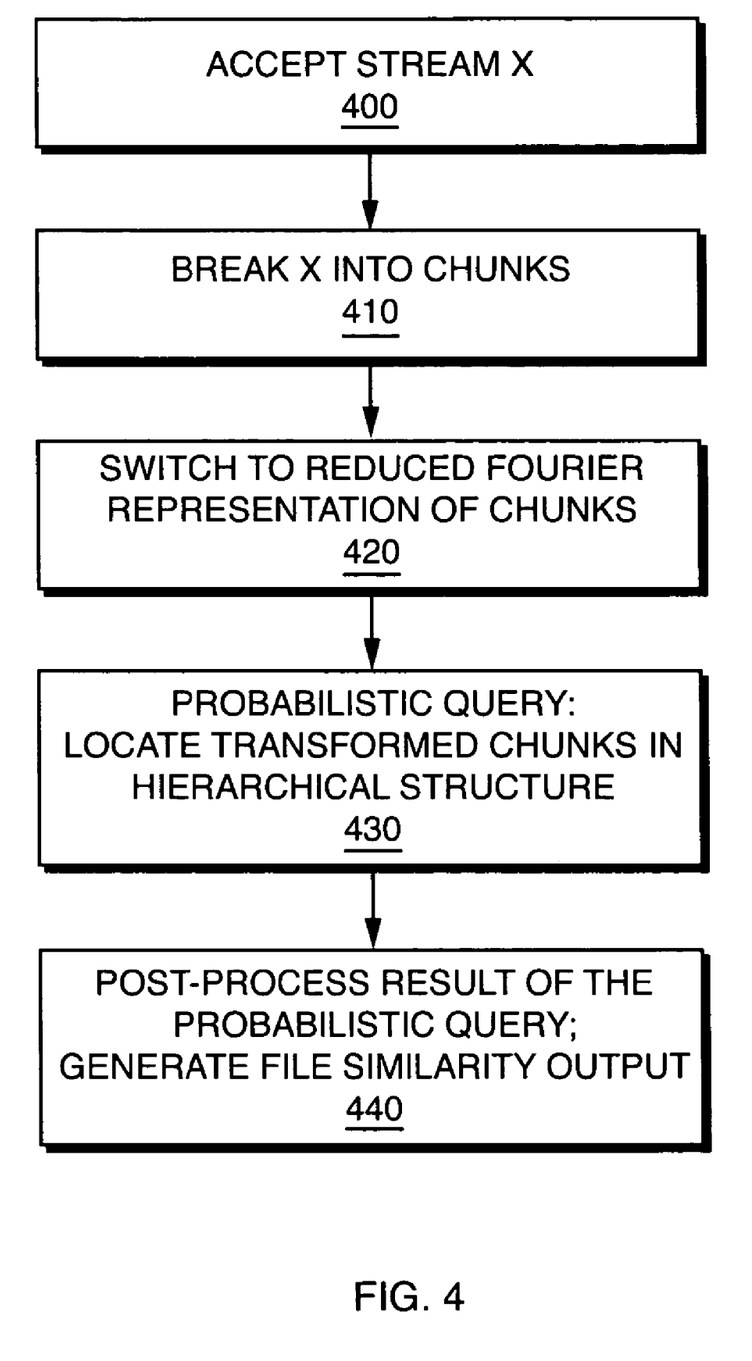
FIG. 4 is a high level flow diagram of the algorithm that the SDE uses to identify similar documents.

FIG. 4 is a representative flow chart of the SDE 160 process at a high level. A first step 400 is thus to receive a stream of data, and then to determine its chunks in 410. At 420, the Fourier coefficients of the chunks are calculated, only few of them are retained, while the rest are discarded (more on this later). Then a sequence of steps 430 are performed to compare the Fourier coefficients of the chunks against Fourier coefficients of chunks of files in the database, in an ordered fashion, to determine a degree of similarity in step 440.

The number of chunks a typical file system is broken down into is very large, and an efficient query mechanism into the database of their Fourier coefficients and a way to maintain the data in its compressed format is needed. In particular, simple SQL-based queries cannot locate similar data chunks because they will consider a great disparity of only few Fourier coefficients, even out-weighed by a good match of others, as a mismatch. The SDE 160, however, exploits a so-called nearest neighbor search, and does not regard a mismatch of a small number of Fourier coefficients as a critical disparity.

At step 420 then, an efficient representation of the set of vectors, comprised of chunk coefficients, is a tree-like structure of large clusters of coefficients, split into smaller clusters until the cluster size is small enough to represent a group of sufficiently similar chunks. The clustering algorithm implements a concept of a hash function on the sets of Fourier coefficients, playing a role somewhat similar to indexing a database.

As to more details of step 420, the SDE 160 first searches the clusters at the highest level to find the cluster that contains the chunk being queried. It continues this process until it reaches a matching chunk (or set of chunks) at the bottom of the cluster hierarchy or discovers that a similar chunk does not exist. The SDE 160 can thus map similar documents into the same sets of clusters, thus, a high level of data compression is achieved by keeping only the coordinates of the clusters themselves, rather than of all the chunks which fit into them.

As it will be shown below, it is not of vital importance for the overall performance of the SDE 160 that a single chunk lookup query guarantees locating similar chunks, if ones exist. Contrary to deterministic database architectures, in which a retrieval of matching records is assured, the SDE 160 query finds the correct matches in only a majority of cases, as opposed to all cases, and returns a formally erroneous mismatch or "not found" response in others. In an environment of such relaxed requirements, the query can be significantly optimized for speed.

The clusters within the hierarchy have a substantial degree of intersection, so that going down all the branches of the tree where the similar clusters might possibly be found drives the query down most of the branches and eliminates the benefit of having a hierarchy (as compared to a simple set of clusters). The query uses probabilistic estimates to determine which clusters are most likely the hosts of the given chunk and proceeds only to explore the branches of the hierarchy, passing through these clusters. This multi-branch, probabilistic search provides a configurable balance between the required accuracy and performance that is vital to determine document similarity in real time.

Query accuracy in step 440 can be significantly improved, if, besides the original query, the SDE 160 initiates two more similar queries. In these queries only the data from either the first or the last half of the original chunk is used for Fourier-transforming, while the data from the other half is set to zero. If a chunk, similar to the one being queried, exists on the system, it would include (rather than intersect with) one of the half-chunks being queried and their similarity would be significantly larger. Of the three queries, the query that retrieves the set of the most similar chunks will generate the most reliable result.

A single chunk query is unable to determine what document contains a chunk similar to the given, because many chunks from the file system may and typically do fall into a single cluster. The query interpreting procedure 440 thus integrates results from a number of queries 430 the SDE 160 executes for several consecutive chunks of a given file or stream and outputs the names (or IDs) of a few files that are most similar to the given. The SDE 160 also outputs a probabilistic measure of its result to support the accuracy of the query result. This measure is used as a similarity estimate within a document distribution path, or a certainty factor within an information security system.

Extraction of Data From Multi-content Files

Some common types of files (e.g. office documents) carry information of different nature separately, in different streams. There are methods that separate this information, on a stream-by-stream basis. These tools can be leveraged for the purpose of faster chunk database lookups. For example, text information does not need to be matched against a database of pictures, and a given implementation may decide to not consider certain type of information (e.g. downloaded web pages) as sensitive.

Mathematical Aspects of Designing the Preferred Embodiment

The aim in designing the comparison process using a sparse representation of the Fourier coefficients was to design an algorithm capable of matching data from a stream to a pre-defined database that contains all the chunks from all documents available to the SDE 160. Consider two n-dimensional data vectors x and y (of not necessarily the same length). The convolution of the vectors is defined as:

$$conv(x, y) \equiv x \otimes y \equiv \sum_p x_p y_{q-p}$$

If the convolution, as a function of its index, q, has a high value at a certain q, relative to its mean, two chunks of the vectors are probably similar to each other. The fact that convolution exhibits a number of peaks means that there are many matching chunks inside vectors x and y, and the distances by which the pairs of the matching chunks are offset from the beginning points of their host vectors are different.

Figure 5:
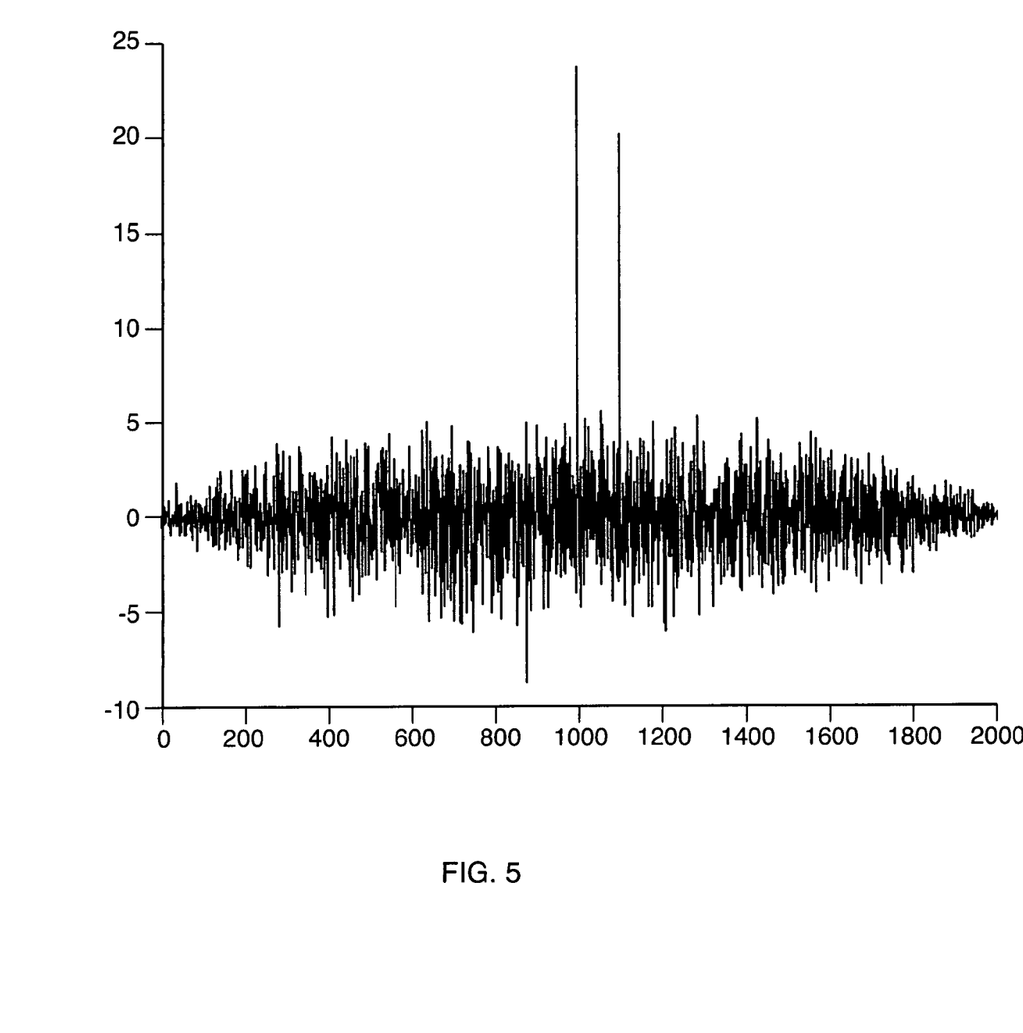
FIG. 5 illustrates a convolution of two vectors, which might each represent the components of a lowest level in a document chunk hierarchy. The convolution here has two relatively offset common parts, a quarter of the vector length each, as well as two peaks on top of random noise.

FIG. 5 is an example convolution result. The following matlab script was used to generate the signal shown:

```
clear
n=1000;
a1=rand(n,1); a2=rand(size(a1));
1part=n/4; n1part=1; n2part=n1part+1part-1;
j1part=n1part:n2part; j2part=n/2+(n1part:n2part);
a2(j1part)=a1(j1part); a2(j2part)=a1(j2part+100);
a1=a1-mean(a1); a2=a2-mean(a2);
c=conv(a1,flipud(a2)); plot(c)
```

The function conv(x, y), or, rather the height of its peaks, is a good measure of similarity between the vectors x and y. The following feature of the function can be used to construct the algorithm. Consider the Fourier spectrum of the vectors x, y, and conv(x, y). According to convolution theorem:

$$\mathbb{F}_{conv(x,y)} = \mathbb{F}_x \cdot \mathbb{F}_y,$$

where $\mathbb{F}$ designates applying Fourier decomposition to a vector. This expression can be easily verified by multiplying both sides of the above equation by exp(ikq), summing over q and switching the summations in the right-hand side. Fourier coefficients are, generally speaking, complex numbers. Consider taking the absolute value and then computing the average of both sides of the expression above:

$$<|\mathbb{F}_{conv(x,y)}|> = <|\mathbb{F}_x| \cdot |\mathbb{F}_y|>,$$

where |•| designates taking absolute value of a complex number, and <•> stands for averaging, after removing the mean values. If vectors x and y match with no phase shift between them, the average in the right-hand side of the expression would be larger than the one taken between random vectors with the same amplitude and length. However, even if there is a phase shift between x and y, it would be reflected in difference of the phases of their Fourier coefficients (as opposed to the difference of their magnitudes), and the effect of this phase shift is eliminated by means of taking the absolute value.

This formula provides one of the mathematical foundations for the comparison algorithm. For the description of a number of similar algorithms, see, e.g. M. J. Atallah, F. Chyzak, P. Dumas, "A Randomized Algorithm for Approximate String Matching".

The expression in its right-hand side is very similar to the formula for the correlation between the absolute values of the two vectors' Fourier coefficients. Thus, we reduced the problem of comparing two streams to the problem of calculating the correlation coefficients between their Fourier coefficients. We do not have to retain all the Fourier coefficients of the data, stored in the chunks of documents in order to estimate the correlation coefficient with an accuracy sufficient for our needs. Our experiments revealed that only about 10% of those were in fact required. Different strategies for selecting the indices of those few needed coefficients were tried and the strategy, in which lower-frequency coefficients are retained demonstrated the best results.

One of the benefits of this approach versus finding the peaks of conv(x, y) is due to the fact that Fourier coefficients of vectors of certain lengths (multiples of small prime numbers, preferably an integer power of 2) can be calculated in time almost linear with the vectors' lengths. A popular algorithm known as Fast Fourier Transform runs in time O(n log n) if the length of the vector is n. The application of this algorithm makes calculation of the mean of the Fourier coefficient of the convolution of two vectors substantially faster than the direct calculation of the convolution itself, which is quadratic in time with the size of the vectors.

Let us consider the problem of calculating correlation between coefficients of vectors in a greater detail. Consider two random vectors, the components of which are normally (Gaussian) distributed. Let us examine the distribution function of their correlation coefficient r. It is a fact known from statistics, that if vectors are of a sufficiently large length k (k>10 can be considered large enough a number for the purposes of this statement), the distribution function of a quantity $$y \equiv \frac{1}{2} \log \frac{1+r}{1-r}$$

is approximately normal with the dispersion D=1/(k−3). See G. A. Korn, T. M. Korn. "Mathematical Handbook for Scientists and Engineers", McGraw-Hill, 1968.

This statement means that under the above conditions, the measured correlation coefficient of the two vectors differs from its theoretical value, and the difference decays with the length of the vectors approximately exponentially.

The above statement does not apply directly to the correlation coefficients of the Fourier components of data stored in chunks of documents, as it is unclear how Fourier coefficients of the data stored in one chunk are distributed (according to normal or some other distribution). In fact, we found that in many real-life cases the distribution function of Fourier coefficients of data stored in chunks of documents was not normal. We found that applying simple techniques (discard outliers, etc.) was sufficient to drive the distribution function of Fourier coefficients to approximately normal.

We now put the question "Are two chunks of the documents similar?" into a common statistical framework. We intend to test a statistical hypothesis "The chunks of two documents are unrelated." Under the assumption that the absolute values of the Fourier coefficients of the data stored in chunks of documents are normally distributed, the hypothesis is reduced to: "The quantity y introduced above belongs to a normal distribution with zero mean and the dispersion of 1/(k−3)" (k is the number of Fourier coefficients we use). This test is one of the most common and well studied in statistics. This reformulation of the problem lets us use two qualitative expressions "chunks of files are similar" and "Fourier coefficients of data stored in the chunks of files correlate well" interchangeably.

Our conclusion was that in order to test a chunk of a document against a database of available chunks, we may choose to test the hypothesis: "The two chunks are unrelated" for the given chunk and every chunk in the database. However, since a part of the file system exposed to the SDE 160 and the database of chunks 175 (see FIG. 1) may be very large, this test is prohibitively expensive. We must therefore invent an approach more efficient than the "test against every chunk" or "exhaustive search" methods for our problem. In an attempt to address this concern, we designed a tree-like "world inside the world" structure (see FIG. 6) of chunks of documents. What is of critical importance is the fact that the relationship of correlation is approximately transitive: if a correlates with b and b correlates with c, then a correlates with c. In other words, if the center of a small cluster of vectors does not exhibit a strong correlation with some given vector, it is unlikely that the given vector will have a strong correlation with any vector in the cluster.

Let us consider a space whose elements are Fourier coefficients of data stored in the chunks of the documents exposed to the SDE 160, normalized to have unitary $L_2$ norms. We use the correlation between the vectors as the measure of similarity of elements within this space.

Figure 6:
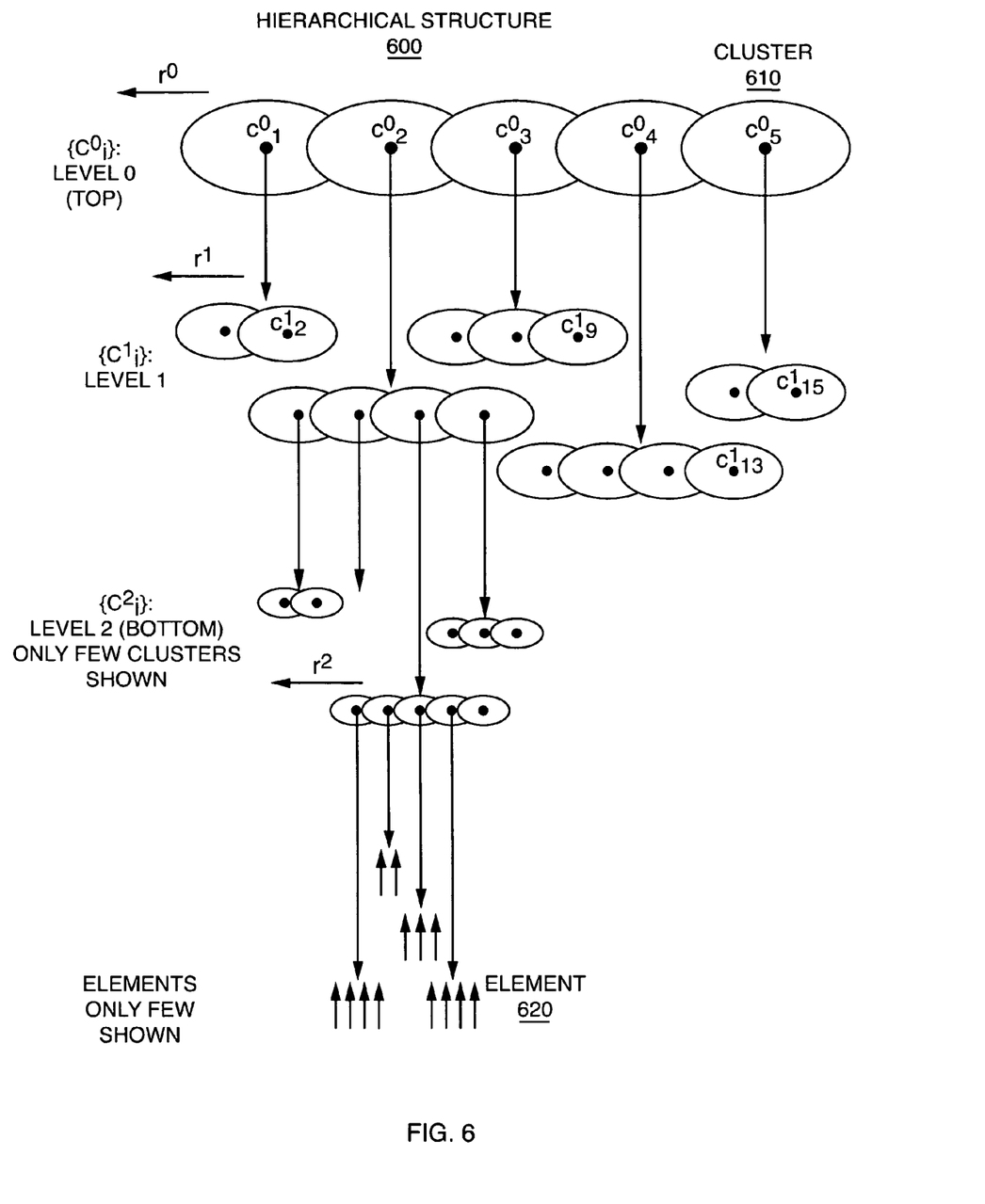

With the approximate relationship of transitivity in mind, a hierarchical structure of clusters is created, as sown in FIG. 6. The following explains in detail how this structure 600 substantially supports more efficient queries for chunks similar to the given than the "check against every" method, i.e., an exhaustive search. In particular, the queries must drill down in to the branches of a structure 600 that pass through the centers of the clusters that correlate with the vector being queried.

We now describe the clustering method we used to build the hierarchical structure 600 of clusters mentioned above. Generally, the problem of clustering is NP-hard and requires us to apply advanced algorithms (K-means, Genetic Algorithms, etc.). In our case the impossibility of even maintaining all of the chunks in memory at the same time (not to mention browsing through their data very many times) is a significant complication that eliminates the possibility of using traditional clustering techniques. We need to build an on-line algorithm that is capable of monitoring every chunk only once or at most a few times during the entire process of building the hierarchy.

We chose to construct an algorithm similar to the "Growing Hierarchical Self-Organizing Maps" method described in Dittenbach, M., Rauber, A., and Merkl, D., "Uncovering the Hierarchical Structure in Data Using the Growing Hierarchical Self-Organizing Map", *Neurocomputing,* 2002, 48(1-4): 199-216.

In this algorithm, every cluster changes its location in space as new elements are deposited into it, while such a deposition takes place only when an element falls within the cluster (if there is no such cluster, another one is automatically created by the structure). The clusters we use in our structure are of spherical shape with a pre-defined radius. The radii of clusters at the same level of hierarchy are the same, and they decrease from top to bottom of the hierarchy. Several branches of the hierarchy may originate from a single cluster of any non-bottom level. All the branches reach the common bottom. The elements are registered at the bottom level of the structure. To build our theory, we will use the expression: "a cluster is similar to an element" in place of the more rigorous one: "a cluster with a center, which is similar to an element." The radius of a cluster is associated with the minimal correlation coefficient its member has with its center.

If a cluster contains only a few elements, it moves substantially, and "learns" its appropriate position in space as elements are deposited into it. The steps the cluster makes become smaller as it grows, and eventually, the cluster will become practically immobile. We chose to update the coordinate of the center of the cluster as new elements are deposited into it in such a way that the center is always the mean of all the elements the cluster hosts. Once a cluster moves from its original position, it can no longer be guaranteed that its elements stay within the cluster. It follows from the Central Limit Theorem of statistics, however, that the total distance the center of a cluster drifts from its initial location as new chunks are deposited into it is finite, regardless of how many chunks it hosts. For this reason, elements infrequently fall outside their cluster. The algorithm periodically examines the hierarchical structure 600 periodically examines the motion of its clusters and estimates the probability of the elements of each cluster falling outside their host. It then automatically rechecks into itself the elements of those clusters, for which that probability exceeds a certain threshold (typically $10^{-3}$).

Clusters 610 in our structure 600 appear to have a large degree of intersection with each other. For an element (i.e., the Fourier coefficient set) 620 to be deposited into the structure, there often exist several clusters 610, all of which exhibit a degree of similarity to the element, which is sufficiently high for depositing the element into any of the clusters. We are therefore often required to decide which cluster among those is the most appropriate host for the element being deposited. We define this logic further in this section.

Our hierarchical structure 600 has several issues that are common in all tree-like structures. First these structures perform well only when they are properly balanced, i.e., the number of elements in each branch, starting from a given level, is roughly the same. Simple tree structures allow on-the-fly balancing (as the elements are deposited), whereas the more complex tree structures require periodic rebalancing procedures. Our structure also requires such procedures, and the SDE 160 invokes the appropriate methods while the workstation 102 is idle (see FIG. 1).

Figure 7:
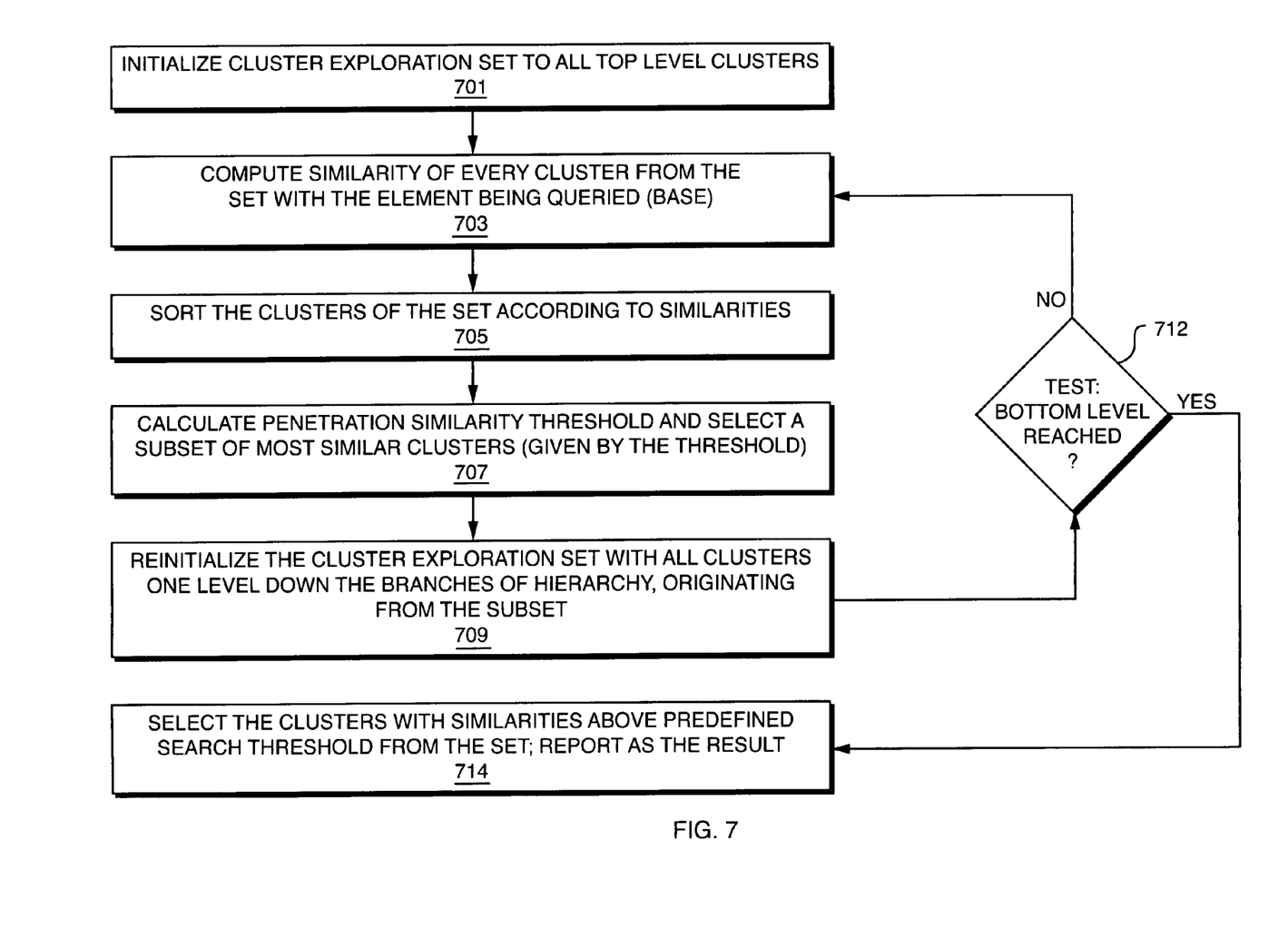
FIG. 7 is a flow chart of operations used to query the hierarchical structure for clusters, similar to a given element (referred to as "the base of the query").

With reference to the flowchart of FIG. 7, we now describe the procedure of querying a hierarchical structure of clusters of elements for a set of clusters that exhibit a sufficiently high correlation with a given element. In data mining, such procedures are referred to as "similarity search." The goal of the procedure under discussion is to walk through as few branches of the structure as possible (thus reducing the time it takes to fulfill the query) while locating as many clusters that meet the search criterion as possible. Formally, our search criterion is always: "The correlation of the center of a cluster with a given element is higher than the specified threshold". The value of this threshold, $r_q$, is an external parameter of the procedure and, along with how it is selected, is discussed later in this section. In line with the algorithm's overall goals, the accuracy of the procedure is formulated in probabilistic terms, i.e., the procedure does not guarantee that it will locate all of the clusters that meet the defined criterion.

Designate an element being queried as q (to be also referred to as "the base of the query"). Designate all the clusters of the hierarchical structure at its topmost level (see FIG. 6) as $$\{C_i^0\}$$

and their centers as $$\{c_i^0\}.$$

At first, the procedure examines the topmost level of the hierarchical structure (see FIG. 7, stage 701). It follows from geometrical considerations, that the probability of finding an element x exhibiting a high similarity with q in a certain cluster $C_j^0$ increases with the correlation coefficient between $c_j^0$ and q:

Let x:corr(q, x)>r, then $$P\{x \in C_j^0\} \propto \exp[corr(q, c_j^0)]$$

(approximately)

This formula is fundamental to our query procedure. The next stage 703 of the procedure computes the correlation coefficients of q with all $c_i^0$.

The following step 705 is to sort the clusters according to the values of these coefficients. At the next step 707 the procedure selects a subset of clusters $$\{\tilde{c}_i^0\}$$

out of $$\{c_i^0\},$$

which are most likely the hosts of elements that exhibit high similarities with q. The probability threshold $P_q$ used to distinguish between clusters falling within $$\{\tilde{c}_i^0\}$$

and others is a parameter that is external to the procedure. This parameter is typically chosen in the range of $P_q \sim 10^{-2} - 10^{-4}$, which we have found to be an acceptable tradeoff between speed and accuracy of the procedure. Parameter $P_q$ is the probability that the procedure will not report an element, exhibiting a high similarity with q. The procedure automatically calculates the correlation threshold $\tilde{r}^\Theta$, corresponding to $P_q$ at the top-most level of the hierarchical structure. The subset of clusters $$\{\tilde{c}_i^0\}$$

the procedure selects specifies the subset of the branches in the hierarchical structure that are worth examining in a greater detail.

During the next stage 709, the procedure examines the subsequent (lower) level of the hierarchical structure. It collects all of the clusters that belong to that level of the structure, which also belong to the subset of branches that we found to be worth penetrating at the fist stage of the procedure.

A subset of clusters $$\{\tilde{c}_i^0\}$$

is thus formed at step 709, and the analysis described above is applied to it, with $$\{\tilde{c}_i^1\}$$

used in place of $$\{c_i^0\}.$$

As a result of this analysis, this subset $$\{\tilde{c}_i^1\}$$

is reduced further to $$\{\tilde{\tilde{c}}_i^1\},$$

which is formed by the clusters, exhibiting high similarity with q, and the value of the threshold correlation $\tilde{r}^1$ involved is calculated.

These steps are repeated until the condition 712 discovers that the procedure reached the bottom level of the hierarchical structure and at that level the clusters with the centers exhibiting correlation with q higher than $r_q$ (an external parameter of the procedure, see above) are reported as the result of the procedure (step 714).

As mentioned above, when an element q is being deposited into the hierarchical structure, there often exists more than one cluster $C_i^l$ at a level l of the structure that can host the element. These clusters are such that $corr(q,c_i^l) > r^l$, where $r^l$ is a correlation threshold that defines the cluster radius at level l. Out of this subset of clusters, suitable for hosting q we have to choose the cluster that will be the most appropriate host for q. We now describe how we determine cluster selection.

Suppose we choose some bottom-level cluster of the hierarchical structure $C_j^L$, which, together with other clusters on its branch, hosts the element q (L here designates the bottom level of the hierarchy). Suppose we then execute a similarity query with the same element q taken as the base of the query, as described above. The following criterion specifies the bottom-level cluster as the most appropriate host for q. It is the cluster in which subsequent similarity queries will be able to find the same element with the highest degree of certainty. Note that "greedy" depositing logic, according to which the cluster that is most similar to q is located at each level of the hierarchy and its branch is chosen as the host for q, does not necessarily satisfy the formulated criterion. Indeed, if a certain cluster is very similar to q at the top-most level, the greedy logic would select that cluster as a host for q, and would proceed with selecting lower-level cluster hosts only down the branch originating from that cluster. It may (and often does) happen; however, that the cluster $C_j^1$ that belongs to the selected branch and is most similar to q at the next level of our structure is rather dissimilar from q. In particular, consider the case $r^1 < corr(q,c_j^1) < \tilde{r}^1$, where the meaning of parameters $r^1$ and $\tilde{r}^1$ is described above. Under such circumstances, a subsequent query procedure would not consider $C_j^1$ as a potential host for q and thus would not be able to find q within the hierarchy. Another important aspect, which should be taken into consideration when designing an element deposition procedure, is that clusters of all levels move as new elements are deposited into them. Consequently, a branch of the hierarchy that may seem like a good candidate for an element q at some point may not be such as the structure grows.

The method we prefer to use to locate the most suitable branch of the hierarchical structure to deposit a given element q is described in the following content.

We first execute a similarity query procedure to find the group of clusters at the bottom of the hierarchy that are similar to q.

We then locate a cluster within this group that belongs to a branch most similar with q at all levels of the hierarchy, on average. We define this average as the root mean square of weighted $L_2$ distances between q and centers of the clusters forming the branch at all levels of the hierarchy. The weights in this calculation are the radii associated with $\tilde{r}^{\pm}$ within the preceding query procedure.

As was described above, an element similarity query at step 714 (see FIG. 7) then typically returns a set of clusters similar to the element being queried (the query base). Each cluster within this set contains data chunks from different documents; therefore, a single query is not sufficient to determine which single document hosts the chunk being queried. However, the SDE 160 can execute a number of similarity queries with subsequent chunks from a document taken as bases and then deduce which document hosts the desired chunk based on the results of these queries. To meet this goal, the SDE 160 maintains a database of chunks of documents, which maps the chunks to the clusters of the hierarchy they fall into. Once the SDE 160 executes several similarity queries for subsequent chunks of an unknown document, and obtains sets of clusters similar to those subsequent chunks, another procedure is executed. This procedure accesses document chunk database and retrieves documents, subsequent chunks of which fall into the same clusters as those discovered by the similarity query and do so in the same order. These documents are reported as being similar to the unknown document being queried. The accuracy of post-processing increases exponentially with the number of chunks of the unknown document being queried, so that only a few subsequent chunks of that document need to be examined in order to discover the similarity of the document with one of the pre-processed documents with a high degree of certainty.

We now discuss the parameter $r_q$ of our typical similarity query procedure (see above), which specifies the similarity threshold of the base of the query with the clusters our procedure retrieves. In order to simplify query post-processing, this parameter must have a high enough value to eliminate the procedure from retrieving as many of the clusters as possible that are coincidentally similar to the base. At the same time, the parameter can not be too high, since it might prevent the procedure from retrieving the cluster hosting a chunk similar to the element, which is the ultimate goal of the query. Therefore, this parameter depends on how the query post-processing procedure is implemented; as well as on the dimensionality of the hierarchical structure's space (i.e. number of Fourier modes involved). In our experiments, we found the dimensionality of 70 to be adequate for our purposes, and the parameter $r_q$ was chosen to have about one percent of coincidental cluster retrievals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for maintaining a representation of a history of operations performed on document files in a data processing environment, the method comprising:

sensing access events that involve accessing one or more digital assets at a user client computer device, the step of sensing access events being carried out by a monitor process located within an operating system kernel of the user client computer device;

in response to sensing an access event involving an operation on an existing document file, determining a relationship descriptor that depends on the sensed access event;

in response to sensing an access event in which a new document file is created, comparing contents of the new document file with contents of existing document files contained in a database to measure a percentage of similar content between the contents of the new document file and the contents of the existing document files contained in the database to determine a relationship descriptor for the new document file, the relationship descriptor quantifying a degree by which at least one of the existing document files was modified to create the new document file; and creating an entry in the representation that contains the relationship descriptor.

2. A method as in claim 1 wherein the representation includes other identification of the sensed access event, selected from a group including user identification, invoking process identification, network operation identification, and identification of storage media.

3. A method as in claim 2 wherein the storage media is removable.

4. A method as in claim 1 wherein the representation is represented as a graph having vertices that represent the document files and edges that represent a modification relationship between the document files.

5. A method as in claim 1 wherein the relationship descriptor identifies whether a source document file and the new document file are the same.

6. A method as in claim 1 wherein the relationship descriptor identifies a mechanism by which a source document file was modified to become the new document file.

7. A method as in claim 6 wherein the relationship descriptor is selected from a group including edit, merge, and copy.

8. A method as in claim 6 wherein the relationship descriptor further comprises identification of the mechanism by which the source document file was modified by monitoring a user's access to and/or modification events relevant to the source document file.

9. A method as in claim 1 wherein the representation is used to implement a data security application, and if the measuring step determines that a similar document file exists, applying a security classification previously assigned to the similar document file to the new document file.

10. A method as in claim 9 wherein the monitor process limits user access to a document file according to its security classification.

11. A method as in claim 9 wherein the monitor process limits user control over a document file according to its security classification.

12. A method as in claim 9 wherein the security classification is applied to the new document file, in real time as the document file is initially stored in the system.

13. A method as in claim 1 wherein an initial modification relationship between at least one pair of files is determined by a degree of similarity between document files.

14. A method as in claim 13 wherein the modification relationship is further determined by an access time or modification time of at least one of the document files in the pair of document files.

15. A method as in claim 1 further including determining if the new document file was created from at least one of the existing document files based on the percentage of similar content between the contents of the new document file and the contents of the existing document files.

16. A method as in claim 15 wherein the relationship descriptor includes information relating to the creation of the new document file from the existing document files.

17. A method as in claim 1 further including transmitting the sensed access event to a server for processing.

18. A method as in claim 17 further including storing the representation in the server.

* * * * *